United States Patent
Greenwood et al.

(10) Patent No.: US 6,800,130 B2
(45) Date of Patent: Oct. 5, 2004

(54) CONSTRUCTION MATERIAL

(75) Inventors: Peter Greenwood, Göteborg (SE); Hans Bergqvist, Torslanda (SE); Ulf Skarp, Göteborg (SE)

(73) Assignee: Akzo Nobel N.V., Arnhem (NL)

( * ) Notice: Subject to any disclaimer, the term of this patent is extended or adjusted under 35 U.S.C. 154(b) by 67 days.

(21) Appl. No.: 10/311,744

(22) PCT Filed: Mar. 28, 2001

(86) PCT No.: PCT/SE01/00682

§ 371 (c)(1),
(2), (4) Date: Feb. 3, 2003

(87) PCT Pub. No.: WO01/98227

PCT Pub. Date: Dec. 27, 2001

(65) Prior Publication Data

US 2004/0039088 A1 Feb. 26, 2004

Related U.S. Application Data

(60) Provisional application No. 60/213,517, filed on Jun. 22, 2000.

(30) Foreign Application Priority Data

Jun. 22, 2000 (EP) .................................... 00850116

(51) Int. Cl.$^7$ ............................... C04B 14/04

(52) U.S. Cl. ...................................... 106/737; 106/600
(58) Field of Search ................... 106/737, 600

(56) References Cited

U.S. PATENT DOCUMENTS

| 5,149,370 A | 9/1992 | Olaussen et al. ........... 106/737 |
| 5,368,833 A | 11/1994 | Johansson et al. .......... 423/338 |
| 5,932,000 A | 8/1999 | Bergqvist et al. ........... 106/737 |
| 6,008,275 A | 12/1999 | Moreau et al. ................ 524/5 |

FOREIGN PATENT DOCUMENTS

EP         0533235        3/1993

OTHER PUBLICATIONS

Her, Ralph K., "The Chemistry of Silica"; John Wiley & Sons, Inc., 1979; p. 203–206, 353–354, and 407–409.

T. V. Kuznetsova et al "Effect of a modified silica–containing additive on the hardening of cement systems"; Chemical Abstracts, vol. 108, No. 2, Jan. 11, 1988; Columbus, Ohio; p. 276.

*Primary Examiner*—Paul Marcantoni
(74) *Attorney, Agent, or Firm*—David J. Serbin

(57) ABSTRACT

The invention relates to a construction material comprising a hydraulic binder, water, and an aluminum-modified colloidal silica. The invention also relates to a method for preparing such materials and the use thereof.

14 Claims, No Drawings

CONSTRUCTION MATERIAL

This application claims the benefits of Provisional Application No. 60/215,517 filed Jun. 22, 2000.

The invention relates to a construction material suitable for constructions such as roads, bridges, tunnels and buildings. The invention also relates to a method for producing such material and the use thereof.

BACKGROUND OF THE INVENTION

Construction materials and methods for preparing such materials comprising concrete compositions for constructing bridges, roads, tunnels, buildings, marine constructions are known in the art from U.S. Pat. No. 5,932,000, in which a method for preparing concrete from a mixture of a hydraulic binder, aggregates, water, and colloidal silica is disclosed.

U.S. Pat. No. 5,149,370 discloses a cement slurry comprising an aqueous colloidal silicic acid suspension suitable for oil well applications.

It has been desired in the art to provide new compositions suitable for construction materials resulting in even stronger construction materials than produced hitherto. It has also been desired to provide construction materials containing lower amounts of additives, which may lead to reduced production costs. Furthermore, it has been desired to prepare e.g. concrete mixtures which can maintain their high workability throughout the period of time preceding the setting of the concrete mixture.

The present invention intends to solve the problems described above.

THE INVENTION

The invention relates to a construction material comprising a hydraulic binder, water, and an aluminium-modified colloidal silica.

It has been surprisingly found that a construction material comprising said components increases the early strength, as well as the long term strength of the construction material. Furthermore, it has been found that the construction material comprising the aluminium-modified colloidal silica maintains a high and stable workability.

By the term "construction material" is meant a material, especially which has not yet set, suitable for construction of e.g. roads, tunnels, bridges, buildings, concrete pipes, well cementing, subterranean constructions and other cementitious grouting, and marine constructions such as quays, piers, and jetties.

By the term "aluminium-modified colloidal silica" is meant aluminium-modified colloidal silica in any form, where the colloidal silica may be e.g. silica sol, precipitated silica, silica gel, fumed silica, silica fume or mixtures thereof. Even though aluminium-modified silica sol is the preferred form, and the only form discussed in detail hereunder, the other forms may replace or be mixed with aluminium-modified silica sots as additives in the construction material.

Aluminium-modified silica sots, sometimes also referred to as aluminate or alumina modified silica sols, can be prepared by adding an appropriate amount of aluminate ions, $Al(OH)_4^-$, to a conventional non-modified silica sol under agitation. The aluminate ion solution is suitably a diluted sodium or potassium aluminate solution. The silica particles suitably have from about 0.05 to about 2, preferably from about 0.1 to about 2 Al atoms/nm² surface area of the silica particles. The aluminium-modified silica particles comprise inserted or exchanged aluminate ions, creating aluminosilicate sites having a fixed negative surface charge. The aluminium-modified silica particles remain their high negative surface charge down to pH 3 in contrast to conventional non-modified silica sols, for which the negative surface charge decreases when the pH decreases, normally down to a pH of about 2, which is the point of zero charge for a non-modified silica sol. The surface charge is thus lower for non-modified silica particles than aluminium-modified silica sol at a pH below about 8. The pH of the aluminium-modified silica sol can be adjusted, preferably by means of an ion exchange resin, suitably to a pH ranging from about 3 to about 11, preferably from about 4 to about 10. The aluminium modified silica sol can thereafter be concentrated to yield a silica content from about 1 to about 60 wt %, preferably from about 5 to about 50 wt %. The aluminium modified silica particles suitably have an $Al_2O_3$ content of from about 0.05 to about 3, preferably from about 0.1 to about 2, and most preferably from about 0.1 to about 1 wt %. The diameter of the aluminium-modified silica particles suitably ranges from about 2 to about 200 nm, preferably from about 3 nm to about 100 nm. The procedure of preparing aluminium-modified silica sol is further described e.g. in "The Chemistry of Silica", by Iler, K. Ralph, pages 407–409, John Wiley & Sons (1979) and in U.S. Pat. No. 5,368,833.

In this context, by aluminium-modified colloidal silica is also meant to comprise reaction products of colloidal silica which has reacted chemically with a hydraulic binder or other components present in the construction material or mixture forming the construction material, e.g. calcium silicate hydrate gel.

The aluminium-modified silica particles are suitably dispersed in water or other solvents such as organic solvents, e.g. alcohols, or mixtures of water and organic solvents. The aluminium-modified silica particles are suitably stabilised by cations such as $K^+$, $Na^+$, $Li^+$, $NH_4^+$ or mixtures thereof.

The specific surface area of the aluminium-modified silica sol is suitably from about 10 to about 1200 m²/g, preferably from about 30 to about 1000 m²/g, and most preferably from about 60 to about 900 m²/g.

The mixture of components making up the construction material may be sensitive to the water/hydraulic binder ratio. If too much water is present, this may render the composition unstable leading to bleeding and segregation. By addition of aluminium-modified silica sol, it is possible to avoid such effects and at the same time obtain a material having a high early strength and long term strength compared to compositions containing non-modified silica sol.

Aluminium-modified colloidal silica particles are distinguished from alumina coated silica particles, in which particles the silica surface is coated (covered) with a layer of alumina, resulting in particles showing the same properties as alumina particles. Both alumina particles and alumina-coated silica particles have e.g. a positive surface charge.

The hydraulic binder may be e.g. a cement such as Ordinary Portland Cement (OPC) or blended cements as further described in e.g. U.S. Pat. No. 6,008,275.

The components making up the construction material, i.e. hydraulic binder, aluminium-modified colloidal silica, and water suitably have a weight ratio according to the following: hydraulic binder (dry weight):aluminium-modified colloidal silica (dry weight) from about 1:0.0005 to about 1:0.2, preferably from about 1:0.001 to about 1:0.1. The weight ratio hydraulic binder (dry weight):water suitably is from about 1:0.22 to about 1:4, preferably from about 1:0.25 to about 1:2.5.

According to a preferred embodiment, aggregates may be comprised in the construction material. By the term "aggregates" is meant material such as stone, gravel and sand, and other preferred inorganic material, suitably having an average particle diameter range from about 0.01 to about 100 mm, preferably from about 0.125 to about 100 mm. Aggregates is suitably comprised in the construction material in a ratio from about 100 to about 1000 wt % based on the weight of the hydraulic binder. Aggregates contribute to a higher strength of the construction material and makes it less expensive to produce.

Preferably, a fine filler can be comprised in the construction material, suitably in the range from about 0.1 to about 40 wt % based on the weight of the aggregates. The addition of a fine filler can contribute to a denser and more stable composition.

By the term "fine filler" is meant particles of a maximum diameter of 125 $\mu$m. Suitable fine fillers include limestone, sand, glass, fly ash and other inorganic materials such as calcium magnesium silicate. The type of fine filler used depends on the application. In Swedish self compacting concrete (SCC), limestone is frequently used while in German SCC and in American residential concrete, fly ash is often used, whereas Swedish high strength concrete (HSC) often comprise sand as a fine filler etc.

Preferably, the weight ratio of fine filler aggregates is from about 0.001:1 to about 0.4:1, preferably from about 0.015:1 to about 0.3:1.

According to a preferred embodiment, the construction material comprises a plasticiser and/or a superplasticiser, such as a sulphonated naphtalene formaldehyde condensate, a sulphonated melamine formaldehyde condensate, a polycarboxylate or mixtures thereof, preferably a polycarboxylate and/or a sulphonated naphthalene formaldehyde condensate. Sulphonated naphthalene formaldehyde condensates are especially preferred when used in construction material for well cementing applications, because these superplasticisers are not so sensitive to the high temperatures occurring in wells.

By the term "polycarboxylate" is here meant to comprise a group of polymer compounds comprising a backbone having carboxylic groups linked thereto. The polycarboxylate molecular weight suitably ranges from about 1000 to about 2 000 000 g/mole, preferably from about 2000 to about 1 000 000 g/mole. The backbone can also comprise other linked groups such as polyacrylic or polyether chains. The molecular weight of the backbone suitably is from about 1000 to about 100 000 g/mole, preferably from about 5 000 to about 20 000 g/mole. Suitable polycarboxylates are further described in e.g. U.S. Pat. No. 6,008,275.

Also other additives can be comprised in the construction material, e.g. retarders, air-entraining agents, accelerators, emulsion latex, hydrophobising agents, shrinkage reducing agents, corrosion inhibitors etc. The dosage of these additives suitably is in the range from about 0.1 to about 10 wt % (dry weight) based on the weight of the hydraulic binder.

The invention also relates to a construction material comprising the reaction products of hydraulic binder, aluminium-modified silica sol, and water.

The invention further relates to a method for preparing a construction material comprising mixing a hydraulic binder, water, and an aluminium-modified colloidal silica, preferably an aluminium-modified silica sol.

The components may be added in any order. Preferably, the aluminium-modified colloidal silica is added after the other components have been mixed. The weight ratios between the components mixed suitably are as described hereabove.

The invention further relates to the use of the construction material as described above in constructions such as roads, tunnels, bridges, buildings such as residential and commercial concrete constructions, concrete pipes, well cementing, subterranean cementing including cementitious grouting, mining applications, and marine constructions.

The invention being thus described, it will be obvious that the same may be varied in many ways. Such variations are not to be regarded as a departure from the gist and scope of the present invention, and all such modifications as would be obvious to a person skilled in the art are intended to be included within the scope of the claims. The following examples will further illustrate how the described invention may be performed without limiting the scope of it.

The following silica sols used in examples 1–3 are listed below. All weight percentages of silica ($SiO_2$) and alumina ($Al_2O_3$) contents are based on the weight of the entire silica sol product.

Silica sol 1: Al-modified silica sol, specific surface area of 850 $m^2$/g, $SiO_2$ content: 7.7 wt %, $Al_2O_3$ content: 0.33 wt %.

Silica sol 2: Non-modified silica sol, specific surface area of 900 $m^2$/g, $SiO_2$ content: 10 wt %.

Silica sol 3: Non-modified silica sol, specific surface area of 750 $m^2$/g, $SiO_2$ content: 15 wt %.

Silica sol 4: Al-modified silica sol, specific surface area of 80 $m^2$/g, $SiO_2$ content: 47 wt %, $Al_2O_3$ content: 0.25 wt %.

Silica sol 5: Non-modified silica sol, specific surface area of 80 $m^2$/g, $SiO_2$ content: 50 wt %.

Silica sol 6: Al-modified silica sol, specific surface area of 220 $m^2$/g, $SiO_2$ content: 30 wt %, $Al_2O_3$ content: 0.2 wt %.

Silica sol 7: Non-modified silica sol, specific surface area of 220 $m^2$/g, $SiO_2$ content: 30 wt %.

The specific surface areas of the silica sols were determined by Sear's method, described in "The Chemistry of Silica", Iler, Ralph K. (1979), p. 203–206, 353–354.

EXAMPLE 1

In the preparation of samples 1–6 below, an aluminium-modified or a non-modified silica sol and a superplasticiser (Glenium 51) were added in amounts as set out in table 1 to a class II cement (Bygg Cement-Skövde CEM II/A-L42.R). 200 kg water, 120 kg fine filler (limestone), aggregates and a superplasticiser (Glenium 51) were added thereto (cf. table 1). Aggregates were added so the total weight of cement, limestone and aggregates became 2140 kg/$m^3$.

The workability of the prepared samples was estimated by measuring the initial spread. The initial spread is measured by placing a freshly mixed concrete composition in a slump cone having a certain cone diameter, which cone is subsequently turned upside-down so that the mass after removal of the cone starts to flow out (according to Standard Test Method ASTM C 143). High spread indicates high workability, which ensures that the concrete mass easily can flow out on the place where it is to set. High workability also ensures that the concrete mass can be stored for a certain period of time without losing the initial fluidity properties it had just after the preparation.

TABLE 1

| Sample No. | Composition per cubic meter of concrete | Superplastisicer (Glenium 51) per m³ of concrete | Slump spread (mm) | Strength MPa 1 day | Strength MPa 28 days |
|---|---|---|---|---|---|
| 1 | 270 kg cement<br>120 kg fine filler<br>5.4 kg silica sol 1 (Al-modified silica sol) | 4.3 kg | 660 | 11.7 | 39.8 |
| 2 | 270 kg cement<br>120 kg fine filler<br>5.4 kg silica sol 2 | 4.1 kg | 670 | 9.6 | 36.1 |
| 3 | 270 kg cement<br>120 kg fine filler<br>5.4 kg silica sol 4 (Al-modified silica sol) | 4.1 kg | 700 | 8.2 | |
| 4 | 270 kg cement<br>120 kg fine filler<br>5.4 kg silica sol 5 | 4.1 kg | 680 | 7.6 | |
| 5 | 240 kg cement<br>120 kg fine filler<br>4.8 kg silica sol 3 | 3.4 kg | 660 | 7.1 | 28.1 |
| 6 | 240 kg cement<br>120 kg fine filler<br>4.8 kg silica sol 1 (Al-modified silica sol) | 3.6 kg | 670 | 8.0 | 30.3 |

Returning to table 1, it can be concluded that sample 1 comprising an aluminium-modified silica sol has a higher early strength (after 24 hours) and long term strength (after 28 days) than has sample 2, comprising a non-modified silica sol, even though the silica content of sample 1 is slightly lower than that of sample 2.

In the same way, sample 3, comprising an aluminium-modified silica sol, shows higher early strength than sample 4 comprising a non-modified silica sol (the two samples have substantially the same silica content). Sample 6, comprising an aluminium-modified silica sol, shows higher early strength and long term strength than sample 5, even though the silica content is lower in sample 5 than in sample 6.

EXAMPLE 2

In the preparation of samples 1–6 below, an aluminium-modified or a non-modified silica sol was added to a class II cement (Bygg Cement-Skövde CEM II/A-L42.R). 200 kg water, 120 kg fine filler (limestone), aggregates and a superplasticiser (Glenium 51) were added thereto (cf. table 2). Aggregates were added so that the total weight of cement, limestone and aggregates became 2140 kg/m³. The superplastisicer and the silica sols were added in amounts as set out in table 2. The workability of the concrete was estimated by measuring the initial spread (cf. example 1). The spread was also measured after 90 minutes (slump spread). The workability loss, i.e. the difference between the initial spread and the spread after 90 minutes was also calculated. The higher the slump spread, i.e. the spread 90 minutes after the measurement of the initial spread, the lower the workability loss.

TABLE 2

| Sample No. | Composition | Superplastisicer (Glenium 51) per m³ of concrete | Slump spread (mm) Initial | Slump spread (mm) After 90 min | Workability loss (mm) |
|---|---|---|---|---|---|
| 1 | 240 kg cement<br>120 kg fine filler<br>4.8 kg Silica sol 1<br>(aluminium-modified silica) | 3.6 kg | 720 | 580 | 140 |
| 2 | 240 kg cement<br>120 kg fine filler<br>4.8 kg Silica sol 2 | 3.6 kg | 750 | 520 | 230 |
| 3 | 270 kg cement<br>120 kg fine filler<br>5.4 kg Silica sol 7 | 4.1 kg | 670 | 440 | 230 |
| 4 | 270 kg cement<br>120 kg fine filler<br>5.4 kg Silica sol 6<br>(aluminium-modified silica) | 4.1 kg | 690 | 550 | 140 |

TABLE 2-continued

| Sample No. | Composition | Superplastisicer (Glenium 51) per m³ of concrete | Slump spread (mm) Initial | Slump spread (mm) After 90 min | Workability loss (mm) |
|---|---|---|---|---|---|
| 5 | 270 kg cement 120 kg fine filler 5.4 kg Silica sol 4 (aluminium-modified silica) | 4.1 kg | 710 | 640 | 70 |
| 6 | 270 kg cement 120 kg fine filler 5.4 kg Silica sol 5 | 4.1 kg | 720 | 610 | 110 |

In table 2, it can be seen that sample 1, comprising an aluminium-modified silica sol, shows lower workability loss than sample 2 (sample 1 has slightly lower content of silica). It can be further seen that sample 4, comprising an aluminium-modified silica sol, has lower workability loss than sample 3 (same silica content in samples 3 and 4). It can further be seen that sample 5, comprising an aluminium-modified silica sol, has a lower workability loss than sample 6, even though the silica content of sample 5 is slightly lower. Generally, from the results obtained, one can conclude that the loss in workability is only about 60 percent for the samples containing aluminium-modified silica sols in relation to the samples containing non-modified silica sols.

EXAMPLE 3

In order to evaluate the fluidity of a cement slurry comprising either aluminium-modified silica sols or non-modified silica sols, 4 slurries were prepared from class I cement (Anlaggningscement Degerhamn CEM I 42,5BV/SR/LA). The slurries had a water/cement weight ratio of 0.35. 2 wt % of a silica sol and 1 wt % of a superplasticiser (a 30 wt % sulphonated naphthalene formaldehyde condensate solution), based on the cement weight, were added to the slurries.

The slurries were mixed with moderate agitation. The yield value and the plastic viscosity (a measure of the rheology of the slurry) were then evaluated by means of a ConTec Viscometer Model 4 (BML Viscometer) after 15, 30, 60 and 90 minutes respectively. The yield value is a measure of the force needed to make e.g. a cement slurry move.

TABLE 3

| Sample No | Silica sol used in slurry | Yield Value in Pascal (Pa) 15 min. | 30 min. | 60 min. | 90 min |
|---|---|---|---|---|---|
| 1 | Silica sol 1 (aluminium-modified silica) | 35.0 | 60.6 | 93.1 | 118.0 |
| 2 | Silica sol 2 | 45.0 | 69.2 | 99.0 | 121.0 |
| 3 | Silica sol 4 (aluminium-modified silica) | 31.4 | 48.0 | 74.3 | 95.9 |
| 4 | Silica sol 5 | 37.4 | 54.6 | 80.4 | 99.9 |

Comparing the samples of table 3, the yield value of samples 1 an 4, comprising aluminium-modified silica sols, are somewhat lower than samples 2 and 3. The slurries must have a minimal yield value to obtain substantially zero free water (no bleeding).

TABLE 4

| Sample No | Silica sol used in slurry | Plastic Viscosity in Pascal seconds (Pas) 15 min. | 30 min. | 60 min. | 90 min |
|---|---|---|---|---|---|
| 1 | Silica sol 1 (aluminium-modified silica) | 0.40 | 0.97 | 1.93 | 2.60 |
| 2 | Silica sol 2 | 0.60 | 1.46 | 2.66 | 3.38 |
| 3 | Silica sol 4 (aluminium-modified silica) | 0.53 | 0.79 | 1.28 | 1.48 |
| 4 | Silica sol 5 | 0.52 | 0.83 | 1.44 | 1.78 |

Table 4 shows great differences in plastic viscosity between the samples containing alumina-modified silica sols and non-modified silica sols. When comparing samples 1 and 2, having substantially same silica content, it is seen that sample 1 (containing an aluminium-modified silica sol) has a lower plastic viscosity than sample 2. It can also be seen that sample 3 (containing aluminium-modified silica sol) has a lower plastic viscosity than sample 4 (samples 3 and 4 have substantially same silica content). A slurry with good flow properties and substantially zero free water, i.e. not liable to bleeding, is highly advantageous, especially in well cementing. Low plastic viscosity means good flow properties, good penetration and bonding properties.

What is claimed is:

1. A construction material comprising a hydraulic binder, water, and an aluminium-modified colloidal silica.
2. The construction material as claimed in claim 1 having a weight ratio of hydraulic binder to aluminium-modified colloidal silica from about 1:0.0005 to about 1:0.2.
3. The construction material as claimed in claim 1 having a weight ratio of hydraulic binder to water from about 1:0.22 to about 1:4.
4. The construction material as claimed in claim 1, wherein the hydraulic binder is a cement.
5. The construction material as claimed in claim 1, wherein the construction material comprises aggregates.
6. The construction material as claimed in claim 1, wherein the construction material comprises a fine filler.
7. The construction material as claimed in claim 1, wherein the construction material comprises a fine filler and aggregates in a weight ratio of fine filler to aggregates from about 0.001 to about 0.4.
8. The construction material as claimed in claim 1, wherein the aluminium modified colloidal silica has an $Al_2O_3$ content of from about 0.05 to about 3 wt %.
9. The construction material as claimed in claim 1, further comprising at least one of a plasticiser and a superplasticiser.
10. The construction material according to claim 9, wherein the superplasticiser is at least one of a polycarboxylate and a sulphonated naphtalene formaldehyde condensate.

11. The construction material being a reaction product of the material as defined in claim 1.

12. A method for preparing a construction material, comprising mixing a hydraulic binder, water, and an aluminium-modified colloidal silica.

13. The method as claimed in claim 12, comprising mixing said hydraulic binder and said water, and thereafter mixing said aluminum-modified colloidal silica with the mixed binder and water.

14. The method as claimed in claim 12, wherein the mixing step forms a reaction mixture, and wherein the method includes the step of forming a reaction product from said reaction mixture.

* * * * *